United States Patent
Howard et al.

(10) Patent No.: US 9,948,614 B1
(45) Date of Patent: Apr. 17, 2018

(54) REMOTE DEVICE INITIALIZATION USING ASYMMETRIC CRYPTOGRAPHY

(71) Applicant: Rockwell Collins, Inc., Cedar Rapids, IA (US)

(72) Inventors: Sean D. Howard, Cedar Rapids, IA (US); Brandon J. Provolt, Cedar Rapids, IA (US); Luke E. Ryon, Cedar Rapids, IA (US); James K. Jezek, Cedar Rapids, IA (US); Jeremy K. Sands, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 83 days.

(21) Appl. No.: 13/901,248

(22) Filed: May 23, 2013

(51) Int. Cl.
*H04L 29/06* (2006.01)
*H04L 9/32* (2006.01)
*G06F 21/32* (2013.01)

(52) U.S. Cl.
CPC ........ H04L 63/0428 (2013.01); H04L 9/3265 (2013.01); G06F 21/32 (2013.01)

(58) Field of Classification Search
CPC ... G06F 21/445; G06F 21/32; H04L 2209/80; H04L 9/0897; H04L 9/3271; H04L 9/3265; H04W 12/06
USPC ........................................................ 713/150
See application file for complete search history.

(56) References Cited

U.S. PATENT DOCUMENTS

| | | | | |
|---|---|---|---|---|
| 4,993,068 A * | 2/1991 | Piosenka et al. | ............ | 713/186 |
| 5,144,667 A * | 9/1992 | Pogue, Jr. | ............... | B60R 25/24 340/5.61 |
| 5,745,576 A * | 4/1998 | Abraham | ............. | G06Q 20/382 380/277 |
| 5,796,840 A * | 8/1998 | Davis | ................... | G06Q 20/341 380/30 |
| 5,805,702 A * | 9/1998 | Curry | ..................... | G06Q 20/06 705/66 |
| 6,263,437 B1 * | 7/2001 | Liao et al. | ..................... | 713/169 |
| 6,609,199 B1 * | 8/2003 | DeTreville | ............ | G06F 9/4406 713/156 |
| 6,671,804 B1 * | 12/2003 | Kent | ............................ | 713/175 |
| 7,861,081 B2 * | 12/2010 | Yeap | ....................... | G06F 21/33 713/167 |
| 8,473,150 B2 * | 6/2013 | Martin et al. | ................... | 701/36 |
| 9,191,200 B1 * | 11/2015 | Adams | .................. | H04W 12/06 |
| 2001/0054147 A1 * | 12/2001 | Richards | ............... | H04L 9/3271 713/172 |

(Continued)

FOREIGN PATENT DOCUMENTS

EP     1404083 A2 *  3/2003  ............. H04L 29/06

*Primary Examiner* — Hadi Armouche
*Assistant Examiner* — Bryan Wright
(74) *Attorney, Agent, or Firm* — Angel N. Gerdzhikov; Donna P. Suchy; Daniel M. Barbieri

(57) ABSTRACT

The present disclosure is directed to a system and method for remotely initializing at least one device in communication with a local host device utilizing an asymmetric cryptographic authorization scheme. According to various embodiments, at least one remote device sends an authorization request including a random value to the local host device. The local host device returns an approval response to the remote device, where the approval response includes the random value encoded utilizing a private key. The remote device is then initialized (e.g. powered on or placed in an active state) upon verification of the encoded random value utilizing a public key that is paired with the private key.

20 Claims, 4 Drawing Sheets

(56) References Cited

U.S. PATENT DOCUMENTS

| | | | | |
|---|---|---|---|---|
| 2001/0056534 A1* | 12/2001 | Roberts | G06F 7/588 | 713/168 |
| 2003/0093698 A1* | 5/2003 | Challener | G06F 21/606 | 726/22 |
| 2004/0005061 A1* | 1/2004 | Buer | G06F 21/602 | 380/282 |
| 2004/0060977 A1* | 4/2004 | Proennecke | G06Q 20/20 | 235/375 |
| 2004/0064720 A1* | 4/2004 | Hessel et al. | | 713/200 |
| 2005/0113068 A1* | 5/2005 | Hoffmann | H04L 9/3271 | 455/411 |
| 2007/0200671 A1* | 8/2007 | Kelley et al. | | 340/5.72 |
| 2009/0002333 A1* | 1/2009 | Maxwell | G06F 3/04883 | 345/173 |
| 2009/0132828 A1* | 5/2009 | Kiester | H04L 9/3247 | 713/185 |
| 2009/0293118 A1* | 11/2009 | Yan | G06F 21/12 | 726/19 |
| 2010/0031029 A1* | 2/2010 | Ilyadis | H04L 9/3271 | 713/156 |
| 2010/0191967 A1* | 7/2010 | Fujii | G06F 21/32 | 713/169 |
| 2011/0200193 A1* | 8/2011 | Blitz | H04L 9/3271 | 380/277 |
| 2011/0202203 A1* | 8/2011 | Johansson | G05D 1/0022 | 701/2 |
| 2012/0321076 A1* | 12/2012 | Shah et al. | | 380/44 |
| 2014/0337234 A1* | 11/2014 | Tang | H04L 9/3265 | 705/71 |
| 2015/0331099 A1* | 11/2015 | Wu | G01S 13/876 | 342/32 |

\* cited by examiner

REMOTE DEVICE INITIALIZATION USING ASYMMETRIC CRYPTOGRAPHY

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of FA8678-10-C-0058.

TECHNICAL FIELD

The present disclosure generally relates to the field of cryptography and more particularly to cryptography in remote applications.

BACKGROUND

Cryptographic controllers are employed in a variety of infrastructures to secure access to certain devices or network resources. Existing systems typically require that a device remain unauthorized (i.e. not sending or receiving secure data) until initialized or powered on. Cryptographic initialization schemes are commonly implemented according to contextual security requirements. For example, several applications require cryptographic ignition keys (CIKs) for device initialization, requiring that a user directly enter a code into a user interface of the device or physically insert a CIK into a receiving port. In some applications, the user may be alternately enabled to bring the CIK within threshold proximity of the device, such as in the case of electromagnetic or optically interfacing CIKs.

Physical presence of the user in proximity of the device is becoming less practical in modern infrastructures where remote applications are increasingly prevalent. Additionally, increased availability and utilization of unsecured networks complicate the task of enabling remote initialization without compromising overall system security. Accordingly, there is a need for remote cryptography schemes to meet emerging security needs.

SUMMARY

The present disclosure is directed to remote initialization utilizing an asymmetric cryptography scheme. In one aspect, the disclosure is directed to a system for remotely initializing at least one device utilizing a local host device. A remote device may be configured to send an authorization request, including a random value, to the local host device. The local host device may be configured to send an approval response to the remote device, where the approval response includes the random value encoded utilizing a private key. The remote device is then initialized (e.g. powered on or placed in an active state) upon verification of the encoded random value utilizing a public key that is paired with the private key.

In some embodiments, the system includes a local cryptographic controller communicatively coupled to or integrated with the local host device. The local cryptographic controller may be configured to encode the random value received from the remote device utilizing the private key and further configured to send the encoded random value to the local host device. Further, a remote cryptographic controller may be communicatively coupled to or integrated with the remote device. The remote cryptographic controller configured to generate the random value for the authorization request and further configured to verify the encoded random value received by the remote device.

In another aspect, the disclosure is directed to a method of remotely initializing at least one device including at least the following steps: initiating a cryptographic authorization sequence after receiving a secure input value at a local host device; receiving an authorization request including a random value from a remote device in communication with the local host device; sending an approval response including the random value encoded utilizing a private key to the remote device; and initializing the remote device when the encoded random value is verified utilizing a public key.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

FIGS. 1 through 4 generally illustrate an asymmetric cryptography scheme for initializing one or more remote devices in communication with at least one local host device. The system and method illustrated by the following embodiments provide an extensible framework enabling a one-to-many relationship between a local device directly accessed by a user and one or more remote devices. Further, the asymmetric authorization scheme allows the remote devices to be unauthenticated and run in an insecure mode until initialized. Remote initialization will allow for user convenience and reduced foot print. The remote cryptographic initialization scheme is further extensible to ignition sources located within any machinery or equipment where user space is limited or where remote access is advantageous. For instance, the advantages of remote cryptographic initialization will be appreciated in remote applications involving unmanned vehicles or other unmanned equipment or machinery. The following embodiments are illustrative of any implementation of remote cryptographic initialization and are not intended to limit the present disclosure unless otherwise stated.

Several asymmetric key cryptography standards are known to the art such as, but not limited to, RSA, DSA, and ECDSA cryptography. Asymmetric key cryptography is generally characterized by a private (secure) key that is only provided via authorized access and a public (insecure) key or certificate utilized to verify the private key. According to various embodiments, the public key or a plurality of public keys are stored by one or more remote devices. At least one local host device is enabled to securely initialize and access the remote devices with one or more paired private keys. The key pairing thus allows for unique identification and verification of the local host device (i.e. authorized access device) without requiring declassification of the remote device prior to initialization. The terms initialization, ignition, power up, or startup may be used throughout the disclosure to generally refer to transitioning a device from an inactive state or low activity state to an active state whereupon secure data may be transferred or authorized actions (e.g. engine startup, motor control) may be performed.

Figure 1:
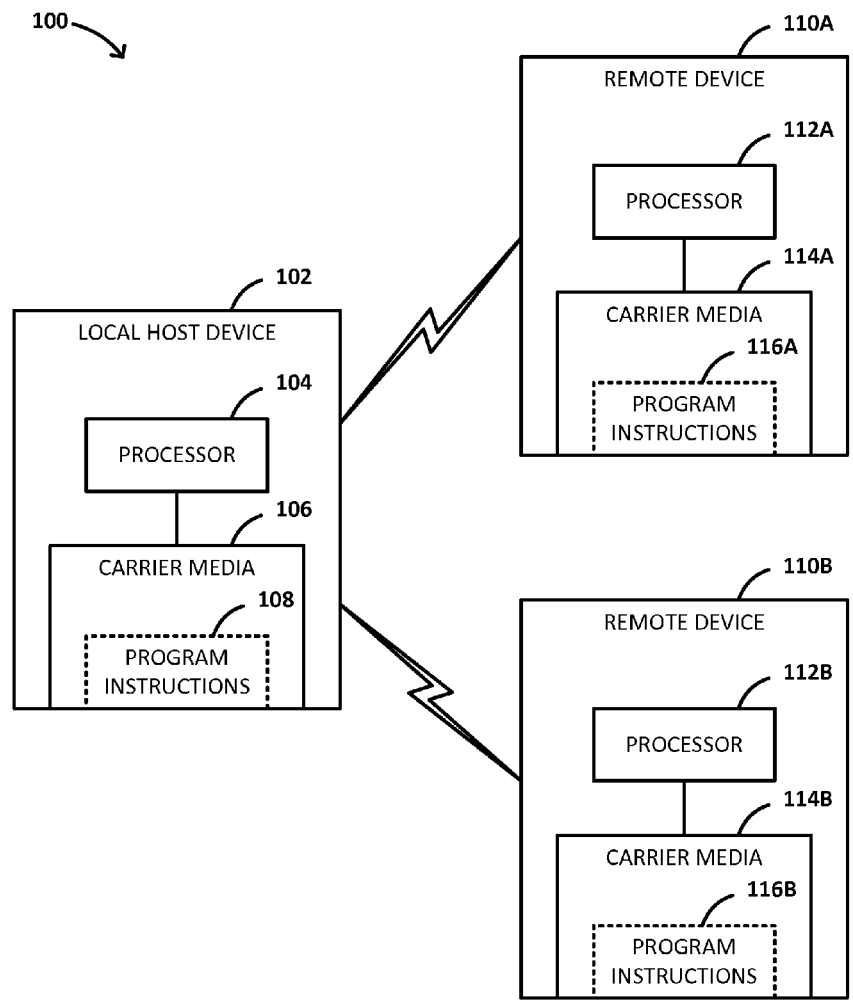
FIG. 1 is a block diagram illustrating a system for initializing one or more remote devices from a local host device, in accordance with an embodiment of this disclosure.

As illustrated in FIG. 1, a system 100 may include at least one local host device 102 in communication with one or more remote devices 110. Each device 102 and 110 includes respective hardware, software, and/or firmware configured to execute the various functions or steps described herein. For example, each device 102, 110 may include at least one respective processor 104, 112 configured to perform functions or steps according to program instructions 108 executed from at least one carrier medium. According to various embodiments, the local host device 102 is in communication with the one or more remote devices 110 via any wired or wireless communication protocol known to the art, such as a direct transmission link, local area network, wireless area network, and the like. Further, the devices 102 and 110 may be communicatively linked via secured or unsecured networking.

In some embodiments, a remote device 110 is configured to only exchange insecure data until initialization to prevent security breaches, such as hacked (unauthorized) access, especially in situations where data is exchanged over unsecured networks. The local host device 102 may be configured to provide secured user access utilizing a secure input value. In some embodiments, the local host device 102 is configured to initiate a cryptographic authorization sequence with the remote device 110 after receiving the secure input value which may include a user entered PIN or a pass code stored by at least one carrier medium (e.g. CIK) interfaced with the local host device 102. The remote device 110 is configured to send an authorization request including a randomly generated value to the local host device 102. In response, the local host device 102 is configured to send an approval response including the random value encoded utilizing a private key. The remote device 102 initializes when the encoded random value is verified or authenticated utilizing a public key.

Figure 2:
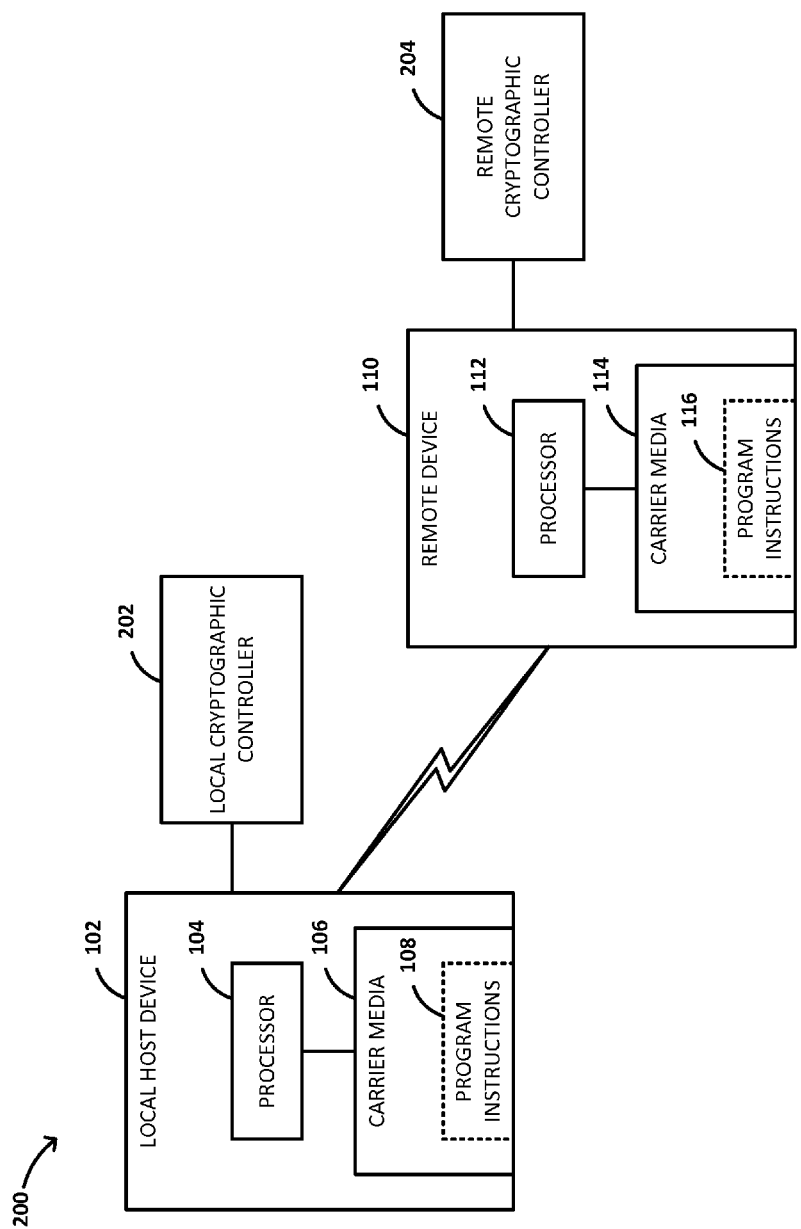
FIG. 2 is a block diagram illustrating the system wherein each of the local host device and the remote device includes or is communicatively coupled to a respective cryptographic controller, in accordance with an embodiment of this disclosure.

In some embodiments, illustrated in FIG. 2, a system 200 further includes at least one local cryptographic controller 202 and at least one remote cryptographic controller 204. The controllers 202 and 204 may be communicatively coupled to or integrated with the respective local host and remote devices 102 and 110. For example, each controller 202 and 204 may be embodied in a separately linked device. Alternatively, each controller 202 and 204 may form a portion of the hardware, software, and/or firmware of the respective local host and remote devices 102 and 110.

The remote cryptographic controller 204 may be configured to generate a random value for inclusion in each authorization request sent by the remote device 110. For example, the remote cryptographic controller 204 may include a random number generator configured to generate a $2^N$ value, such as a 32 bit or 64 bit random value. Accordingly, an arbitrarily large number of secure initializations may be performed between the local host device 102 and the remote device 110 with low risk of repeated credentials.

The local cryptography controller 202 may be configured to sign or encode the random value received in the authorization request from the remote device 110 utilizing the private key. When the approval response including the encoded value is returned to the remote device, the remote cryptographic controller 204 is further configured to verify or decode the response value utilizing the public key. For example, the asymmetric relationship between the private key and the public key may enable the remote cryptographic controller 204 to determine whether the approval response includes the same random value that was sent by the remote device 110 in the authorization request.

Figure 3:
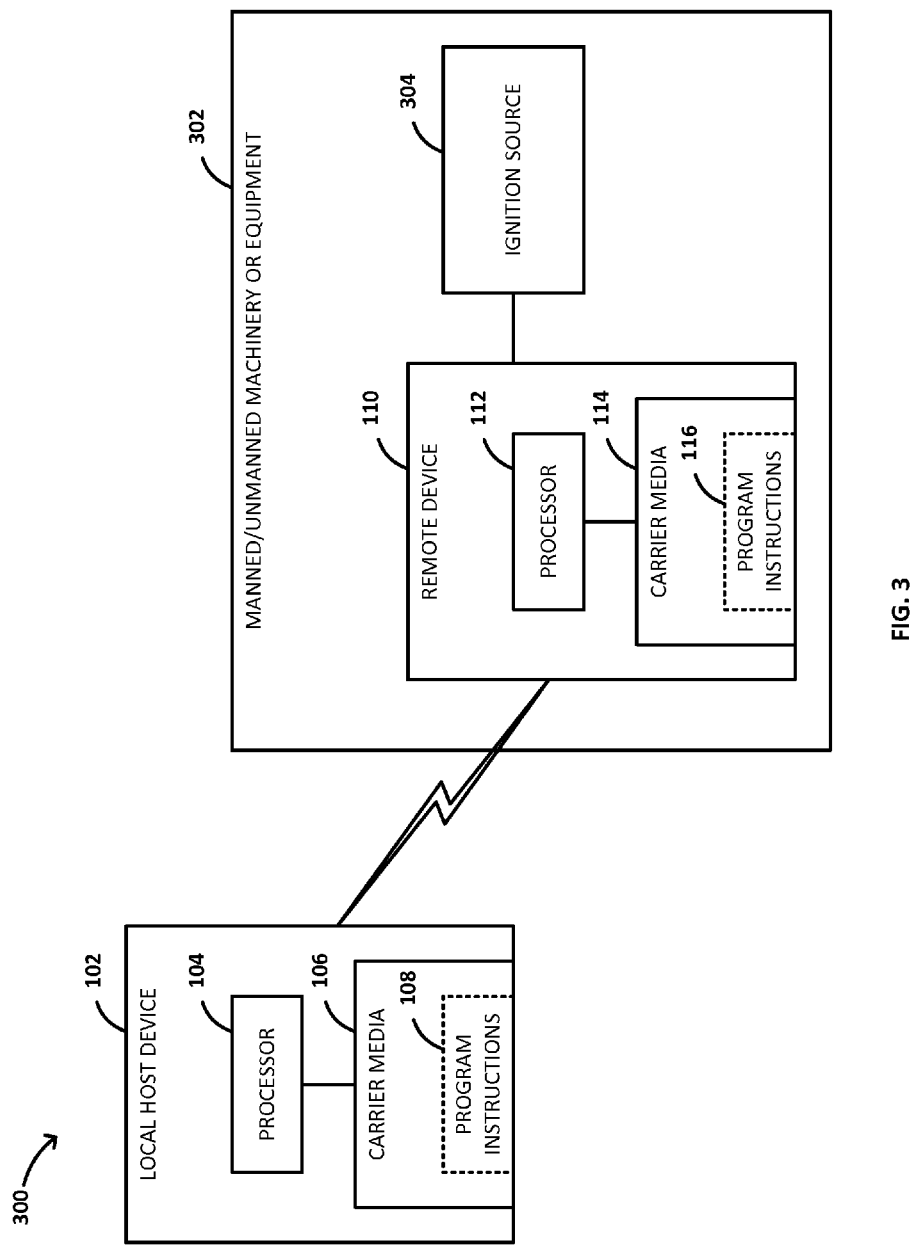
FIG. 3 is a block diagram illustrating the system wherein a remote device is configured to drive at least one ignition source or machinery or equipment containing or coupled with the remote device, in accordance with an embodiment of this disclosure.

In some embodiments, illustrated in FIG. 3, a system 300 may include machinery or equipment 302 coupled to or integrated with the remote device 110. For example, the remote device 110 may drive an ignition source 304 (e.g. starter) for an engine or motor of an aircraft, boat, or ground vehicle. In some embodiments, the machinery or equipment 302 may include an unmanned ground, air, or water vehicle. In unmanned applications, the remote cryptographic initialization scheme described herein may alleviate concerns of limited user space and physical access to controls, thereby allowing unmanned machinery and equipment 302 to be built on a smaller scale. In some embodiments, the remote device 110 is configured to send/receive secure data (e.g. location or status information) or execute selected controls only after initialization 110 to ensure that remote access limited to authorized users via a properly paired local host device 102.

Figure 4:
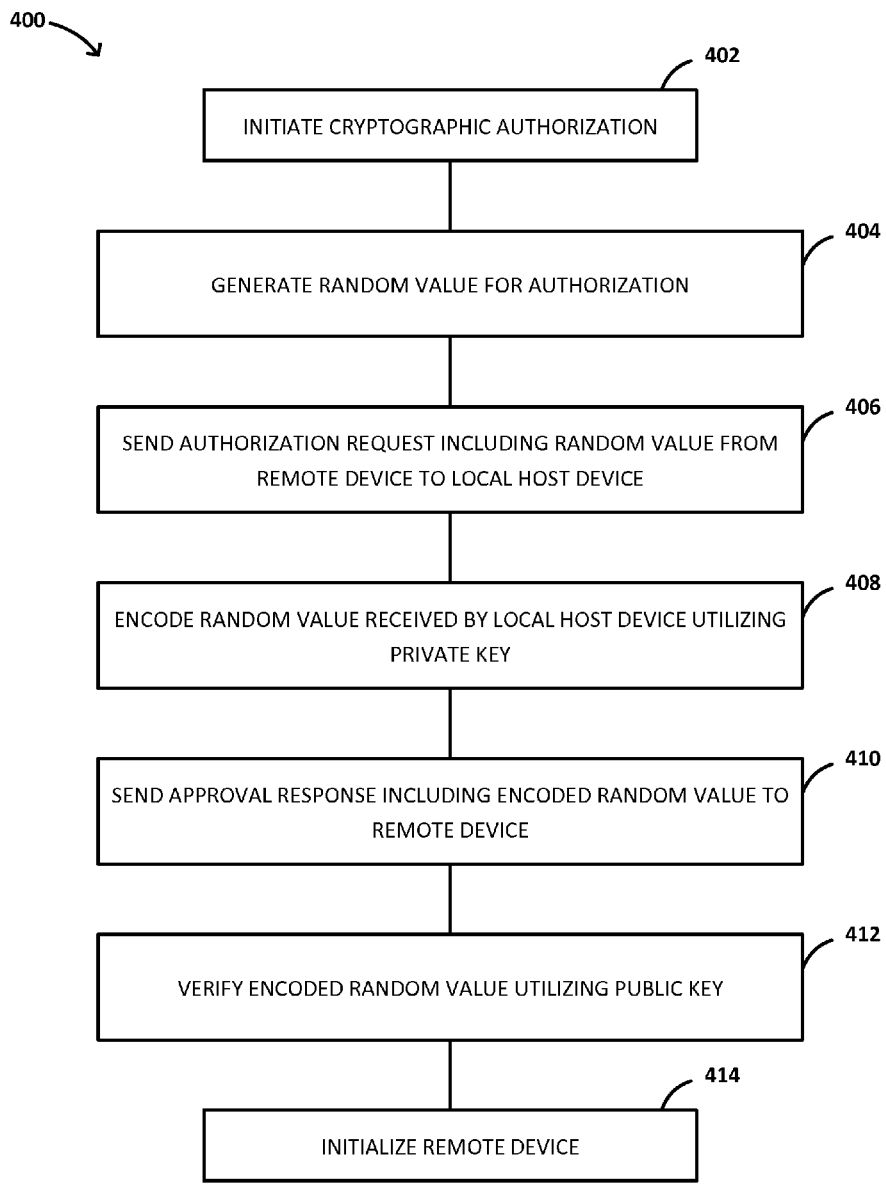
FIG. 4 is a flow diagram illustrating a method of initializing one or more remote devices from a local host device; in accordance with an embodiment of this disclosure.

FIG. 4 illustrates a method 400 of cryptographically initializing a remote device 110 in accordance with the foregoing systems 100, 200, and 300. Accordingly, method 400 may include any step expressed or implied by the foregoing embodiments of system 100, 200, and 300. Further, it is contemplated that one or more steps of method 400 may be executed by a system or device known to the art beyond those described above. As such, method 400 should be understood to encompass any configuration for carrying out the following steps.

At step 402, a remote device 110 is suspended in an inactive or low activity state until a cryptographic authorization sequence is initiated by a local host device 102 in communication with the remote device 100. The local host device 102 may be configured to initiate the cryptographic authorization sequence after receiving a secure input value. For example, the local host device 102 may initiate the authorization sequence after receiving a user input PIN or CIK. In some embodiments, the local host device 102 indirectly receives the secure input value via a communicatively coupled local cryptographic controller 202.

At steps 404 and 406, the remote device 110 sends an authorization request including a random value to the local host device 102. In some embodiments, the remote device 110 sends a first request to a remote cryptographic controller 204 communicatively coupled to the remote device 110. In response to the first request, the remote cryptographic controller 204 generates a random value and sends the random value to the remote device 110 for inclusion in the authorization request that is sent from the remote device 110 to the local host device 102.

At steps 408 and 410, the local host device 102 sends an approval response including the random value encoded (i.e. asymmetrically encrypted) utilizing a private key, which may be stored by the local host device 102 or by a local cryptographic controller 202 communicatively coupled to the local host device 102. In some embodiments, the local host device 102 sends the random value received in the authorization request to the local cryptography controller 202 for encryption. The local cryptography controller 202 then encodes the random value utilizing the private key and returns the encoded value to the local host device 102 for inclusion in the approval response that is sent from the local host device 102 to the remote device 110.

At steps 412 and 414, the remote device 110 is initialized when the encoded value is verified utilizing a public key paired with the private key. The public key may be stored by the remote device 110 or by a remote cryptographic controller 204 communicatively coupled to the remote device 110. In some embodiments, the remote device 110 sends the encoded value received from the local host device 102 to the remote cryptographic controller 204 for verification. The remote cryptographic controller 204 may determine validity of the response (i.e. authenticity of the private key) by decrypting the encoded value of the approval response with the public key. The remote cryptographic controller 204 may send a verification message to the remote device 110 when the approval response is determined to be valid, whereupon the remote device 110 may be initialized. In some embodiments, the remote device 110 may send an acknowledgment message to the local host device 102 after initialization.

It should be recognized that the various functions or steps described throughout the present disclosure may be carried out by any combination of hardware, software, or firmware. In some embodiments, various steps or functions are carried out by one or more of the following: electronic circuits, logic gates, field programmable gate arrays, multiplexers, or computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a memory medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for remotely initializing at least one device, comprising:
   a private and public key pair;
   a local host device configured to:
      initiate a cryptographic authorization sequence after receiving a secure input value,
      receive an authorization request, and
      send an approval response including an encoded random value;
   a remote device implemented within an unmanned vehicle and in communication with the local host device, the remote device configured to:
      send the authorization request including a random value to the local host device, and
      receive the approval response and the encoded random value from the local host device;
   a local cryptographic controller in communication with the local host device, the local cryptographic controller configured to:
      receive from the local host device, the random value,
      encode the random value utilizing a private key, and
      send the encoded random value to the local host device; and
   a remote cryptographic controller in communication with the remote device, the remote cryptographic controller configured to:
      verify the random value received from the remote device by decoding the encoded random value with a public key paired with the private key, and
      send a message to the remote device verifying the approval response is valid, the remote device and the vehicle being configured to initialize to an active state upon receipt of the message, and the remote device being further configured to securely communicate after initialization.

2. The system of claim 1, wherein the active state comprises an enabled state of the remote device to exchange secure data and perform an authorized action including ignition of the vehicle or motor control.

3. The system of claim 1, wherein the secure input value is receivable via a storage medium interfaced with the local host device.

4. The system of claim 3, wherein the secure input value is stored on a cryptographic ignition key.

5. The system of claim 1, wherein the private key is stored by the local cryptographic controller, and wherein the local host device is further configured to send secure data to the remote device only after the remote device is initialized.

6. The system of claim 1, wherein the authorization request is a first ignition authorization request and the approval response is a first ignition approval response, and wherein the local host device is further configured to:
   receive a second ignition authorization request including a second random value from at least a second remote device in communication with the local host device; and
   send a second ignition approval response including the second random value encoded utilizing a second private key to the second remote device, wherein the second remote device starts up and is initialized to an active state only when the second encoded random value is verified utilizing a second public key stored on a second remote cryptographic controller of the second remote device.

7. The system of claim 1, wherein the authorization request is a first authorization request, the approval response is a first approval response, the private key is a first private key, and the public key is a first public key, and wherein the local host device is further configured to:
receive a second authorization request including a second random value from at least a second remote device in communication with the local host device;
send a second approval response including the second random value encoded utilizing a second private key to the second remote device, wherein the second remote device is initialized when the second encoded random value is verified utilizing a second public key stored on a second remote cryptographic controller of the second remote device; and
receive an acknowledgement message from the first remote device or the second remote device, acknowledging initialization.

8. A system for remotely initializing at least one device, comprising:
an uninitialized remote device configured to initialize to an active state upon initiation and verification of a cryptographic authorization sequence, the remote device implemented within a vehicle and in communication with a local host device, and a remote cryptographic controller, the local host device being in communication with a local cryptographic controller, the cryptographic authorization sequence comprising:
initiating of the cryptographic authorization sequence after receiving a secure input value at the local host device;
send a first request from the remote device to the remote cryptographic controller;
send a random value generated at the remote cryptographic controller to the remote device in response to the first request;
sending an authorization request including the random value from the remote device to the local host device;
sending the random value from the local host device to the local cryptographic controller;
encoding, at the local cryptographic controller, the random value utilizing a private key for the encoding;
sending the encoded random value from the local cryptographic controller to the local host device;
sending an approval response including the encoded random value, from the local host device to the remote device;
receiving the approval response including the encoded random value at the remote device;
verifying the encoded random value at the remote cryptographic controller by decoding the encoded random value utilizing a public key paired with the private key, and
sending a verification message to the remote device when the approval response including the random value is verified, wherein the remote device is initialized to the active state when the verification message is received by the remote device, enabling the remote device to securely communicate after initialization.

9. The system of claim 8, wherein the private key is stored by the local cryptographic controller, wherein the public key is stored by the remote cryptographic controller, and wherein the local cryptographic controller and the remote cryptographic controller comprise at least two physically separated devices that are linked respectively to the local host device or the remote device.

10. The system of claim 8, wherein the vehicle comprises an unmanned vehicle and initializing to the active state enables the unmanned vehicle to perform an authorized action and exchange secure data.

11. The system of claim 8, wherein the secure input value is receivable via a storage medium interfaced with the local host device.

12. The system of claim 11, wherein the secure input value is stored on a cryptographic ignition key.

13. The system of claim 8, wherein the local host device is further configured to send secure data to the remote device only after the remote device is initialized.

14. The system of claim 8, wherein initiating of the cryptographic authorization sequence after receiving a secure input value at the local host device comprises receiving the secure input value at the local cryptographic controller and then sending the secure input value from the local cryptographic controller to the local host device for initiating the cryptographic authorization sequence.

15. A method of remotely initializing at least one device, comprising:
initiating, at a local host device, a cryptographic authorization sequence after receiving a secure input value;
receiving, at the local host device, an authorization request including a random value from a remote device in communication with the local host device, the remote device implemented within an unmanned vehicle;
receiving, at a local cryptographic controller, the random value from the local host device in communication with the local cryptographic controller;
encoding, at the local cryptographic controller, the random value utilizing a private key for the encoding;
sending the encoded random value from the local cryptographic controller to the local host device;
sending, from the local host device to the remote device, an approval response including the encoded random value;
receiving, at the remote device, the approval response including the encoded random value;
receiving, at a remote cryptographic controller, the encoded random value for verification from the remote device in communication with the remote cryptographic controller;
decoding, at the remote cryptographic controller, the random value utilizing a public key for the decoding; and
initializing the remote device using the approval response when the encoded random value is decoded at the remote cryptographic controller and the random value is verified,
wherein initializing the remote device authorizes transitioning the remote device to an active state to enable the remote device to engage in one or more communications over a secured network.

16. The method of claim 15, further comprising:
sending an acknowledgement message from the remote device to the local host device to acknowledge initialization of the remote device.

17. The method of claim 15, further comprising:
generating the random value via the remote cryptographic controller; and sending the random value from the remote cryptographic controller to the remote device.

18. The method of claim 15, further comprising:
sending a verification message from the remote cryptographic controller to the remote device when the encoded random value is decoded and the random value is verified.

19. The method of claim 15, wherein the remote device is implemented within the unmanned vehicle, the method further comprising:
performing one or more authorized actions after the remote device is initialized, wherein the one or more authorized actions comprises activating an ignition source of the unmanned vehicle;
sending secure data from the local host device to the remote device only after the remote device is initialized; and
receiving said secure data at the remote device and sending second secure data to said local host device after the remote device is initialized.

20. The method of claim 15, wherein the private key is stored by the local cryptographic controller and the public key is stored by the remote cryptographic controller.

* * * * *